US005548873A

United States Patent [19]
Macias

[11] Patent Number: 5,548,873
[45] Date of Patent: Aug. 27, 1996

[54] SELF-LOCKING CLEAT FOR ROPE, CABLE AND THE LIKE

[76] Inventor: Isreal A. Macias, 325 Spring Park Cir., San Jose, Calif. 95136

[21] Appl. No.: 164,017

[22] Filed: Dec. 8, 1993

[51] Int. Cl.$^6$ ........................................... F16G 11/00
[52] U.S. Cl. ........................ 24/134 R; 24/134 KB; 24/132 WL; 24/115 G
[58] Field of Search ................... 24/134 R, 134 KB, 24/134 P, 132 R, 132 WL, 115 G; 114/218

[56] References Cited

U.S. PATENT DOCUMENTS

| | | | |
|---|---|---|---|
| 1,250,876 | 12/1917 | Hicks | 24/134 R |
| 3,045,306 | 7/1962 | Taylor | 24/134 R |
| 3,091,207 | 5/1963 | Songer | 24/134 R |
| 3,251,107 | 5/1966 | Scott | 24/134 R |
| 3,389,765 | 6/1968 | Pressley, Sr. | 24/134 KB |
| 3,815,538 | 6/1974 | Jurgich | 24/134 KB |
| 3,967,349 | 7/1976 | Christensen | 24/134 KB |
| 4,766,835 | 8/1988 | Randall et al. | 24/134 R |
| 4,878,270 | 11/1989 | Westerkamp | 24/134 R |

FOREIGN PATENT DOCUMENTS

| | | | |
|---|---|---|---|
| 0058646 | 1/1912 | Switzerland | 24/134 R |

*Primary Examiner*—Victor N. Sakran
*Attorney, Agent, or Firm*—Claude A. S. Hamrick

[57] ABSTRACT

An improved self-locking cleat for rope, cable, and the like including a housing, a rotatable generally spherically-shaped engaging member, a biasing means and a positioning means. The housing includes an elongated base, a first passageway generally circular in cross-section and extending transverse to the length of the base. A chamber is formed in the base and is disposed adjacent one side of the first passageway. A length of rope is drawn through the first passageway in either a first or an oppositely directed second direction. The rotatable engaging member is pivotally mounted within the chamber and is positionable at either a first or a second position. The member is biased into the first position by the biasing means and is manually positionable, via the positioning means, into the second position. When the member is in the first position it partially blocks the passageway and engagingly contacts the rope such that the rope may be freely drawn through the passageway in the first direction but not in the second direction. When the member is in the second position it does not block the passageway and does not engagingly contact the rope, such that the rope may be freely pulled through the passageway in either the first or the second directions.

4 Claims, 7 Drawing Sheets

SELF-LOCKING CLEAT FOR ROPE, CABLE AND THE LIKE

BACKGROUND OF THE INVENTION

1. Field of the Invention

This invention relates generally to rope cleats, and more particularly to a rotatable cam-type rope cleat having a rotatable cam-type member for selectively locking and releasing a rope drawn through a passageway formed through an attached housing.

2. Brief Description of the Prior Art

A wide range of devices exist for clamping ropes, cables, and the like. These devices facilitate the fastening and tensioning of such ropes and cables between two points or across a load. A cam-type rope cleat holds rope, cable, and the like secure over a large range of tensions through a straightforward operation.

The rope is drawn into the cleat and through a passageway formed between two opposing cams or between a cam and a rope abutment surface disposed transversely opposite thereto. As the rope is drawn into the passageway it is engaged by the toothed gripping surface of the cam (or cams). As the rope is moved in a first direction, the cam rotates and embeds its toothed gripping surface further into the rope. Thus, further movement of the rope, in the first direction., is prevented. However, the rope may be freely pulled through the passageway in a second direction opposite the first direction.

U.S. Pat. No. 4,912,817 (issued to Sandreid) discloses a gripping device for selectively locking and releasing a rope which may be moved over a guide surface. The device includes a frame having a U-shaped cross-section, a lever which is pivotally mounted in the frame and which rotates about an axis passing transversely through the frame. An engaging member is swingably mounted on the lever; the lever may be moved to a locking position or a releasing position by means of an operating handle on which an eccentric, cooperating with the lever, is mounted. The device disclosed is complicated in design and has many moving parts. The design complexity results in reliability and operating difficulty.

U.S. Pat. No. 3,017,678 (issued to Christensen) discloses a cable locking device. The device includes a body member adapted to have one end of a cable secured therein. The opposite free end of the cable is slidably received in a passageway formed in the body and firmly gripped therein by a lever having an eccentric member pivotable towards the free end of the cable. The clamping force imparted by the eccentric member onto the cable is maintained by a lock that secures the lever. A deficiency associated with this device is that the clamping device is not self-locking. The clamping force must be maintained by locking the lever handle so as to compress the eccentric member onto the cable.

U.S. Pat. No. 5,070,805 (issued to Plante) and No. 4,878,270 (issued to Westerkamp) both disclose cam-type clamping devices that engage and clamp a rope or cable passing through the device. In both devices the rope is drawn through a passageway formed between an engaging surface of a cam and a complimentary rope abutment surface. As the rope is drawn into the passageway along a first direction, it spreads the cam away from the complimentary rope abutment surface. As the rope, under tension attempts to escape the cam, the teeth of the cam press more firmly into the rope and the cam grips and compresses the rope with increasing firmness. Eventually, the rope is unable to be more firmly compressed, and no further motion of the cam results. If the rope is pulled in a second direction, opposite to the first direction, then the rope may be disengaged from the engaging surface of the cam thereby allowing the rope to be pulled through the passageway. The deficiency of the disclosed devices is that a quick disengagement of the rope from the cleat cannot be accomplished. The only way to disengage the rope from the cleat device is to pull the rope in the second direction. This is especially cumbersome and inefficient if a significant length of rope has been previously threaded through the passageway.

U.S. Pat. Nos. 3,091,207 (issued to Songer), 4,766,835 and 4,899,423 (both issued to Randall) disclose similar cam-type devices that engage and clamp a rope, cable or similar article. The disclosed devices feature a cam and an opposing rope abutting surface, both mounted onto a platform that is not enclosed in a housing. The rope or cable passes through a passageway formed between the cam and the corresponding rope abutting surface. Since the passageway is not enclosed in a housing, the rope can be accidentally pulled from the passageway, thereby inadvertently releasing the rope or cable from cleat.

Thus, there is a need to provide an improved rope cleat device that does not possess the shortcomings of the presently employed devices. That is, there is a need to provide a cleat that is self-locking, quickly releases the rope from the engaging cam, is simple with a minimum number of moving parts, and wherein accidental release of the rope from the cleat device is prevented.

SUMMARY OF THE PRESENT INVENTION

It is an object of the present invention to provide an improved rope cleat device having an engaging member or cam that grips rope, cable or similar articles in an attached housing.

It is another object of the present invention to provide an improved rope cleat device that is self-locking in that when the rope is pulled through the housing of the device in a first direction the engaging member or cam locks onto the rope and prevents any further movement in the first direction, and when the rope is pulled in a second direction the cam is disengaged such that the rope may be pulled in the second direction.

It is yet another object of the present invention to provide an improved rope cleat device having a quick release mechanism wherein the cam is selectively disengagable from the rope thereby allowing the rope to be pulled, in either the first or the second direction, through the housing without engaging the cam.

It is yet another object of the present invention to provide an improved rope cleat device having the rope slidably disposed through a closed passageway thereby preventing accidental disengagement of the rope from the cam device.

It still another object of the present invention to provide an improved rope cleat device that is simple in design and construction, having a small number of moving parts.

It is yet still another object of the present invention to provide an improved rope cleat device having a passageway for containing the rope that is accessible by means of a selectably removable cover.

Briefly, an improved self-locking cleat device for rope, cable and the like that includes a housing, a rotatable generally spherically-shaped engaging member, a biasing means and a positioning means. The housing includes an elongated base, a first passageway generally circular in cross-section and extending transverse to the length of the base. The base includes a chamber formed therein and disposed adjacent to the first passageway. A length of rope is drawn through the first passageway in either a first or an oppositely directed second direction. The rotatable engaging member is pivotally mounted within the chamber and is positionable at either a first or a second position. The member is biased into the first position by the biasing means and is manually positionable, via the positioning means, into the second position. When the member is in the first position it partially blocks the first passageway and engagingly contacts the rope such that the rope may be freely drawn through the passageway in the first direction but not in the second direction. When the member is in the second position it does not block the passageway and does not engagingly contact the rope, and the rope may be freely pulled through the passageway in either the first or the second directions.

DETAILED DESCRIPTION OF THE PREFERRED EMBODIMENT

Figure 1:
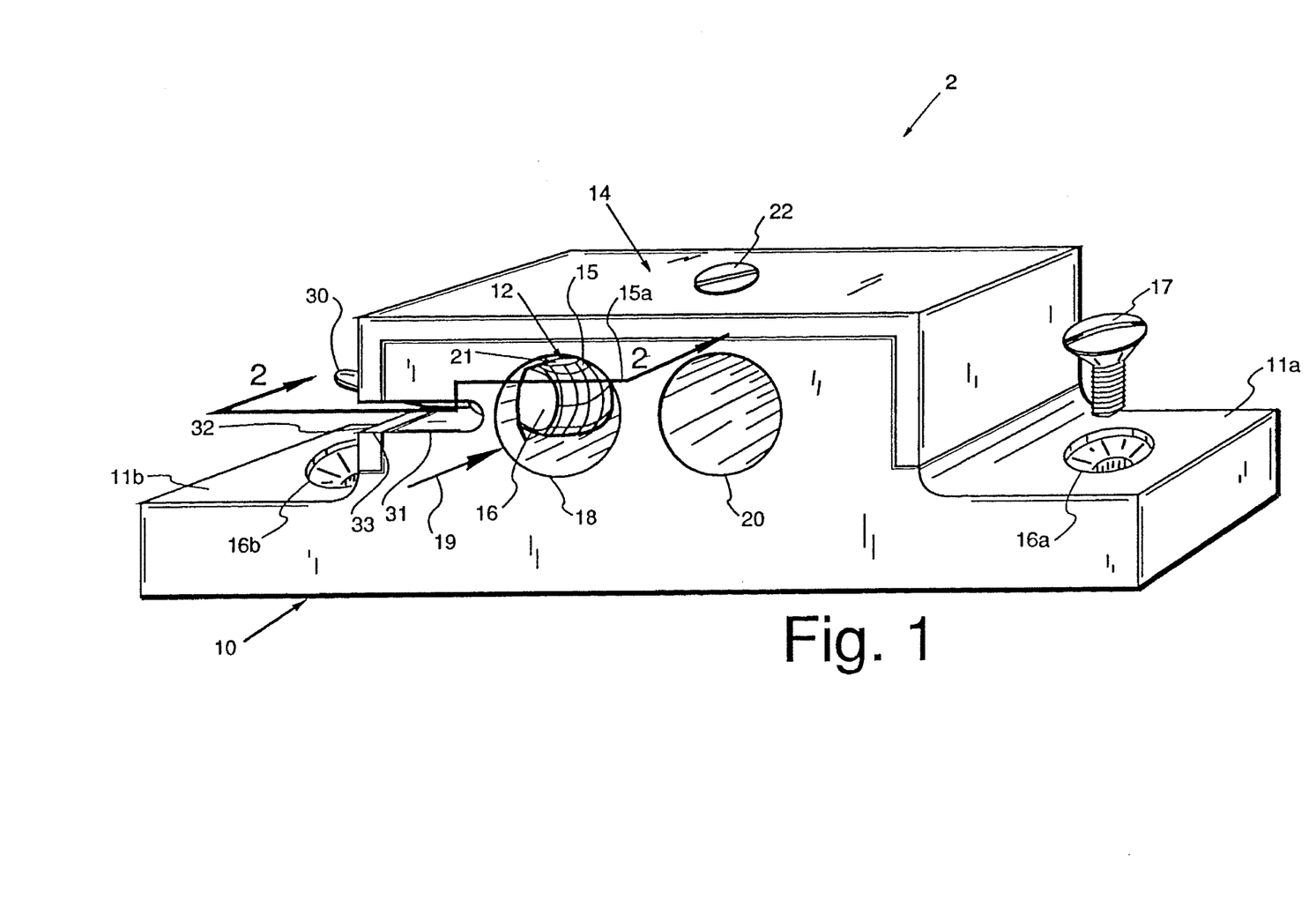
FIG. 1 is a perspective view of a preferred embodiment of an improved rope cleat in accordance with the present invention.

FIG. 1 is a front perspective view of an improved cleat device 2 for clamping rope, cable or similar articles. The cleat 2 includes a molded plastic body or housing 10, and a lid 14 attached thereto by a screw 22. The lid 14 covers a top portion of the body 10. Two holes 16a and 16b are formed in tabs 11a and 11b disposed at either end of the body 10. This configuration allows the cleat 2 to be mounted to any flat surface (not shown) to which the rope is to be secured by means of a screw 17. The holes 16a, 16b may be straight bores (as illustrated) or may be countersunk or counterbored (FIGS. 2, 4–7). The housing 10 also includes two passageways 18, 20 transversely formed therethrough for receiving the rope (not illustrated). The rope is drawn into the first passageway 18, and securable therein. The second passageway 20 is an accessory passageway and takes up any slack in the rope.

A slit 31 is formed in the housing 10, and a corresponding slit 33 is formed in the lid 14. When the lid 14 is disposed onto the housing 10, the slits 31 and 33 form a continuous opening in the device 2.

A rotatable cam or engaging member 12 is pivotally mounted in a chamber (not shown) formed in the housing 10. The cam 12 when disposed in the chamber (not shown), partially obstructs the passageway 18. The engaging member 12 is generally spherically shaped having a flat side surface 13, an engaging side surface 15, and a generally flat upper surface 21. The surface 15 has a plurality of gripping teeth or lugs 15a formed thereon. A cam positioning lever 30 extends from the cam 12, and through the slits 31 and 33, such that the cam may be rotated to position either the surface 13 or the surface 15 (as illustrated) in the passageway 18.

Figure 2:
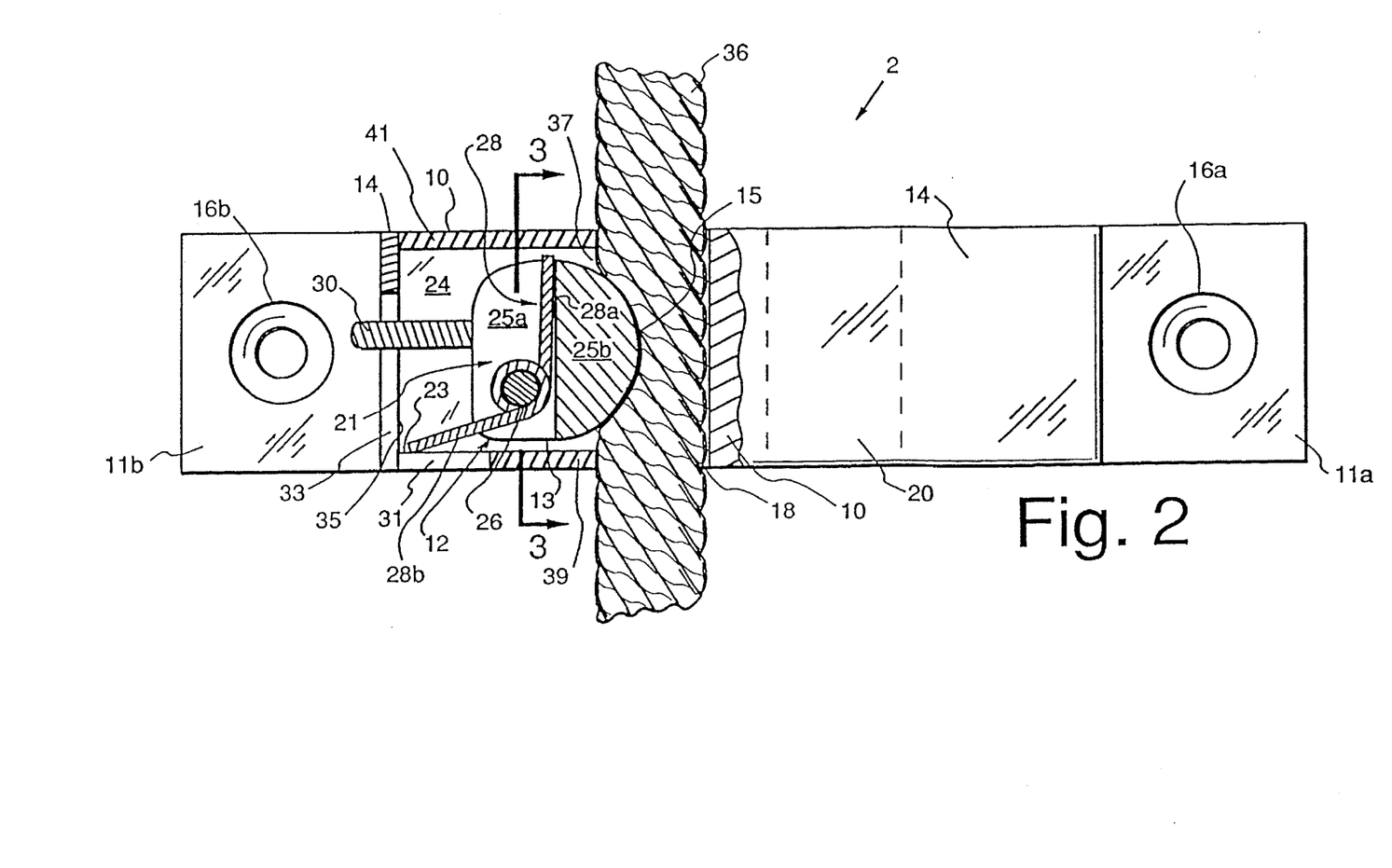
FIG. 2 is a top plan view of an improved rope cleat having a partially sectional view taken along the line 2—2 of FIG. 1.
Figure 3:
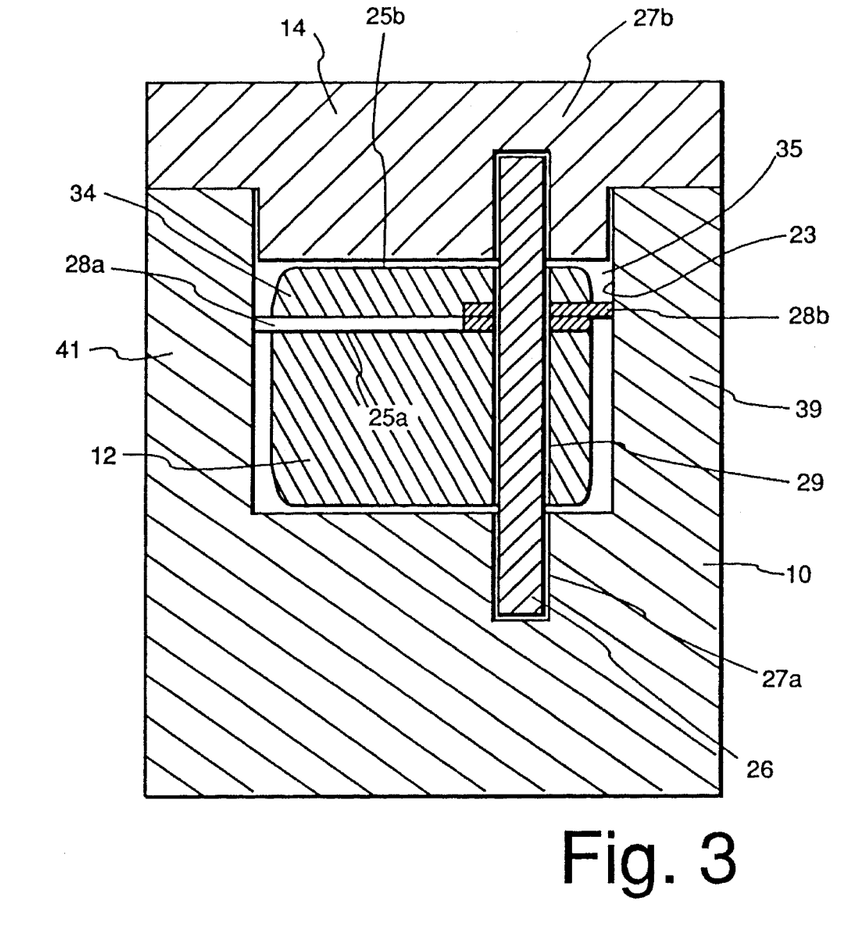
FIG. 3 is a cross-sectional view taken along the line 3—3 of FIG. 2.

FIG. 2 is a top plan view of the cleat 2 illustrated in FIG. 1 partially sectioned to depict the cam 12. Although not shown in FIG. 1, FIG. 2 depicts a rope section 36 drawn through the passageway 18. FIG. 3 is a cross-sectional view taken along the line 3—3 of FIG. 2, with the rope 36 omitted for clarity. Viewing FIG. 2 and 3 together, the cam 12 is disposed in a chamber 24 formed at one end of the body 10 and adjacent to the passageway 18. The chamber 24 is generally U-shaped in cross-section, having upstanding walls 39 and 41, a chamber open end 35 and an opposite end 37 open to the passageway 18. In the illustrated embodiment, the slit 31 is formed through a portion of wall 39 of the chamber 24.

The cam 12 has a generally circular cross-section and eccentrically pivots about a dowel or post 26 disposed in a dowel bore 29 formed through the cam 12. The post 26 is secured, at either end, in dowel holes 27a and 27b formed in the housing 10 and the lid 14, respectively. The cam positioning lever 30 extends from the cam 12 and is disposed relative to the surface 15 and the surface 13 as shown in FIG. 2. The lever 30 protrudes through either the slit 33 formed in the lid 14 or the slit 31 formed in the housing 10. The upper surface 21 of the cam 12 includes flat surfaces 25a and 25b connected by a vertically upstanding wall or shoulder 34. The surface 25b is at a higher level than the surface 25a.

A coil spring 28 having ends 28a and 28b, is disposed on the surface 25b of the cam 12 with the post 26 disposed through the coiled portion of the spring 28. The end 28a is nestled in the junction formed between the wall 34 and surface 25b. The end 28b extends nearly parallel to and contacts with an inner surface 23 of the wall 39.

Figure 4:
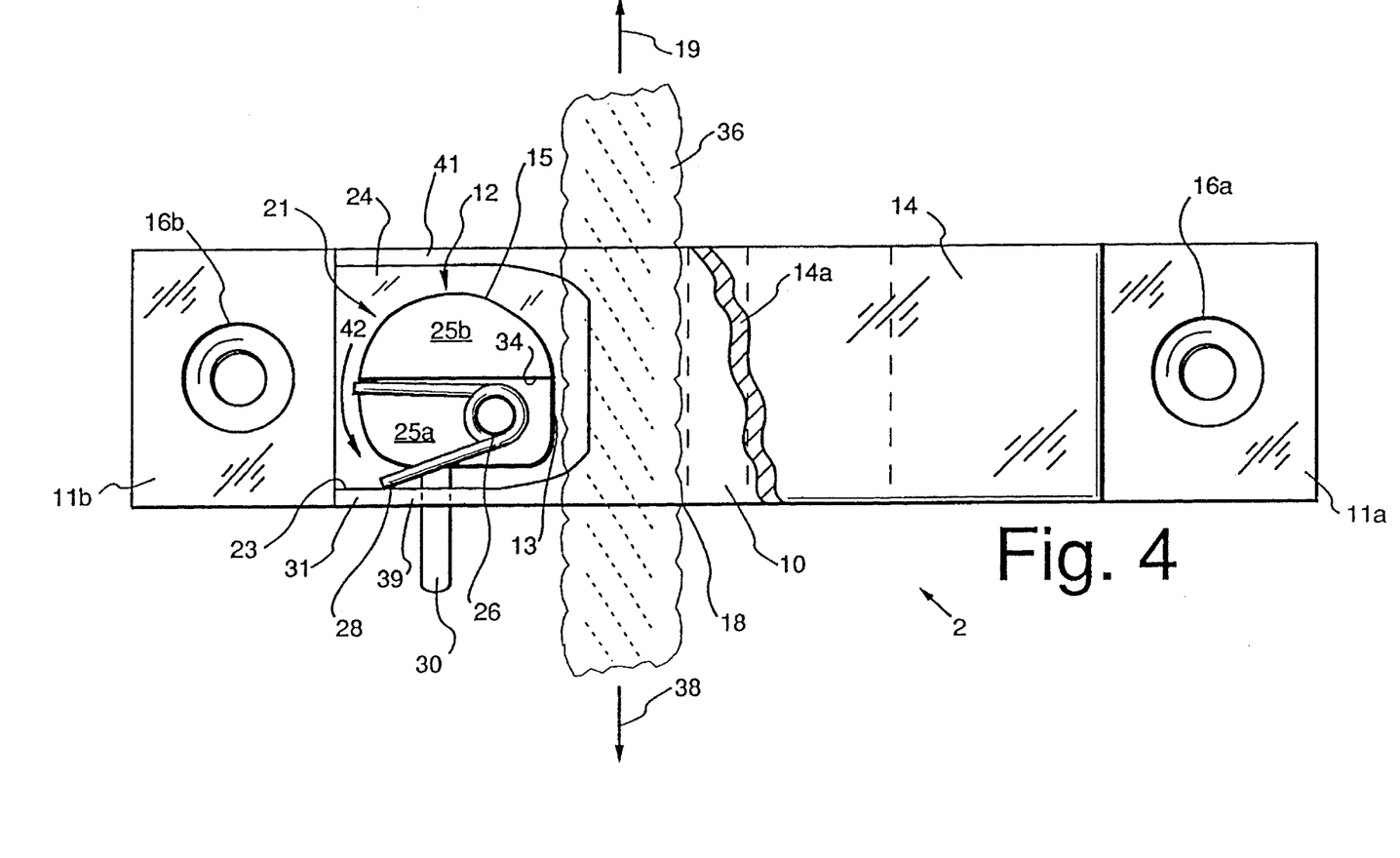
FIG. 4 is a top plan view of the rope cleat illustrated in FIG. 1 having the lid partially removed to illustrate the rotatable cam in the unlocked position.
Figure 5:
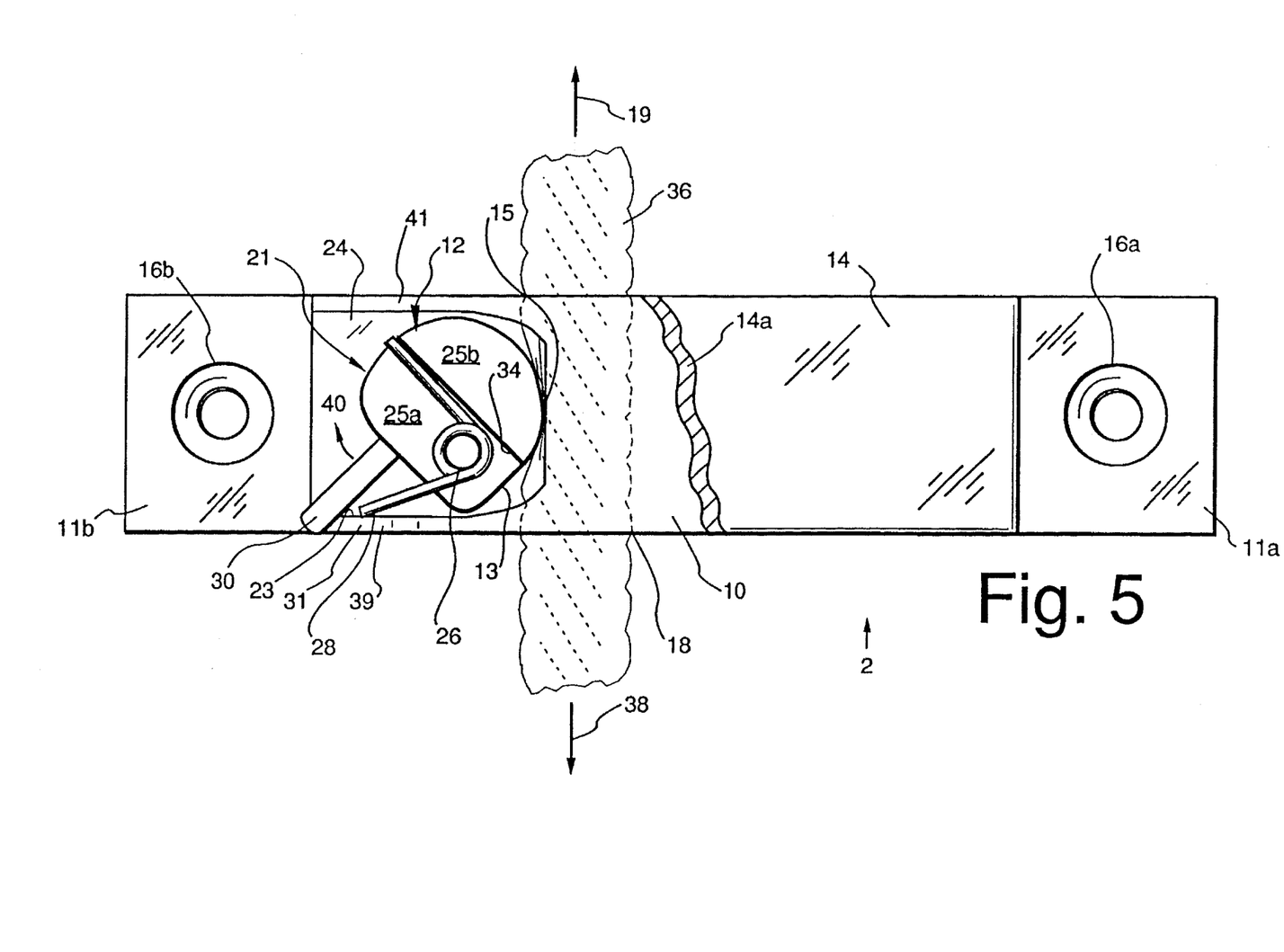
FIG. 5 is a top plan view of the rope cleat illustrated in FIG. 1, having the lid partially removed to illustrate the rotatable cam in the self-locking position.

Referring now to FIG. 4 which is a top plan view of the cleat 2 having the lid 14 partially broken away at 14a to reveal chamber 24 and a partial view of the passageway 18. FIG. 5 is a similar view of the cleat 2. In both figures, the second passageway 20 has been omitted for clarity purposes. Viewing FIG. 4 and 5 together the operation of the cleat 2 can be described.

Initially, a user of the cleat device 2 rotates the cam 12 by means of the lever 30. The cam 12 is rotated in the direction of an arrow 42, i.e., counterclockwise, such that the surface 13 is disposed in the passageway 18 generally parallel to the longitudinal axis of the rope 36. This configuration (FIG. 4) is defined as the unlocked position. When in the unlocked position, the rope 36 may be freely pulled through the passageway 18 in either direction 19 or 38. Also, the cam 12 is rotated such that the lever 30 extends through the slot 31 formed through the wall 39 (FIG. 2). The spring 28 is compressed between the shoulder 34 of the cam 12 and the inner surface 23 of the chamber 24. Thus, the cam 12 is biased to return to the position illustrated in FIG. 5 by the energy stored in the coil spring 28. The cam 12 is manually held in the unlocked position by holding the lever 30 in the position illustrated in FIG. 4.

Once the rope 36 is drawn through the passageway 18, the lever 30 is released, the spring 28 unwinds and rotates the cam 12 in the direction of an arrow 40 (i.e., clockwise). The rotation of the cam 12 causes the engaging surface 15 to engage the outer surface of the rope 36. This configuration (FIG. 5) is defined as the self-locking position. When in this position, the rope 36 can be pulled from the passageway 18 in the direction of the arrow 19 but not in the direction of the arrow 38. When pulled in the direction of arrow 19, the gripping teeth 15a (FIG. 1) of the surface 15 of the cam 12 are not embedded into the rope 36 and the cam 12 can freely pivot about the dowel 26. This allows the rope 36 to move through the passageway 18 in the direction of the arrow 19.

However, if the rope is pulled in the direction of the arrow 38, the gripping teeth 15a (FIG. 1) of the surface 15 are pressed with increasing force into the rope 36 as it is pulled further in the direction of arrow 38. Slippage of the rope 36, along the direction of the arrow 38, is prevented. However, the rope 36 may be disengaged from the cleat 2 at any time by rotating the lever 30 in the direction of arrow 42 to the unlocked position (FIG. 4).

Figure 6:
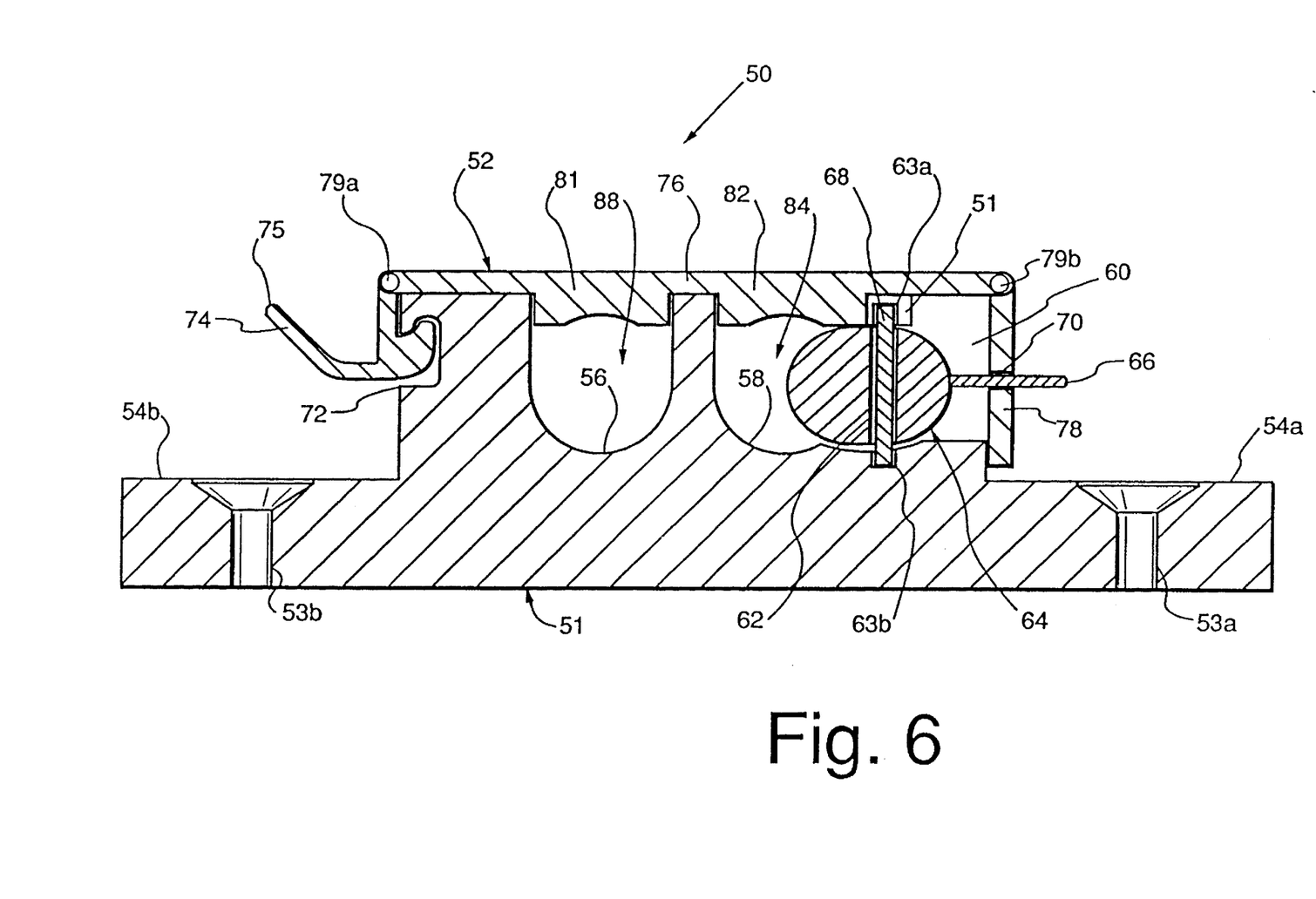
FIG. 6 is a sectional view of another embodiment of an improved rope cleat having a pivotally hinged and removable lid covering the rope passageways.

FIG. 6 is a cross-sectional view showing an alternate embodiment of a rope cleat device 50 which operates in the same manner as the cleat 2 illustrated in FIGS. 1–5. However, in this embodiment the device 50 includes an elongated base 51 having a pair of generally U-shaped (in cross-section) grooves 56 and 58 formed in the top thereof and extending transverse to the length of the base 51. Base 51 also has a cavity or chamber 60 formed therein adjacent one side of the groove 58. The base 51 can be mounted to any flat surface by means of a plurality of screws (not shown) extended through screw holes 53a and 53b formed in tabs 54a and 54b disposed at either end of the base 51. A sectional lid 52 includes a latch plate 74, a top plate 76, and a vertically extending plate 78. The top plate 76 is disposed above base 51 and is hingedly attached, via a hinge 79b, to the vertically disposed end plate 78 that is attached to base 51 by screws (not shown). Note that downwardly extending ribs 81 and 82 are formed in the lower surface of the plate 76 and are aligned with the upper portions of grooves 56 and 58 respectively, to extend thereinto and form upper closures for the passageways 88 and 84. The function of the passageways 88 and 84 are substantially identical to passageways 18 and 20 (FIGS. 1–5). Pivotally affixed, via a hinge 79a, to the other end of the top plate 76 is the latch plate 74, the distel end of which is adapted to engage a notch 72 to lock the sectional lid 52 in place.

An eccentrically rotatable cam or engaging member 64 is disposed in the base 51 such that it normally extends into passageway 84. The cam is pivotally mounted within the cavity or chamber 60 by means of a penetrating dowel 68 that passes through a dowel bore 62 formed through the cam 64. The ends of the dowel 68 are secured in dowel holes 63a and 63b formed in the body 51. A cam positioning lever 66 extends from the cam, out through a slot (not shown) cut in one side of the base 51 and through a slot 70 formed in the plate 78.

The operation of the cam and its interaction with a rope drawn through the passageway 84 is substantially identical to that of cam 12 and the passageway 18 (FIGS. 4–5).

The lid 52 is rotatable upwardly from engagement with the top of the base 51 by pulling upwardly on a lid handle 75. The removable lid 52 allows the rope (not shown) to be placed into or removed from the passageways 84 (or 88) by a downward push (or an upward pull) on the rope.

Figure 7:
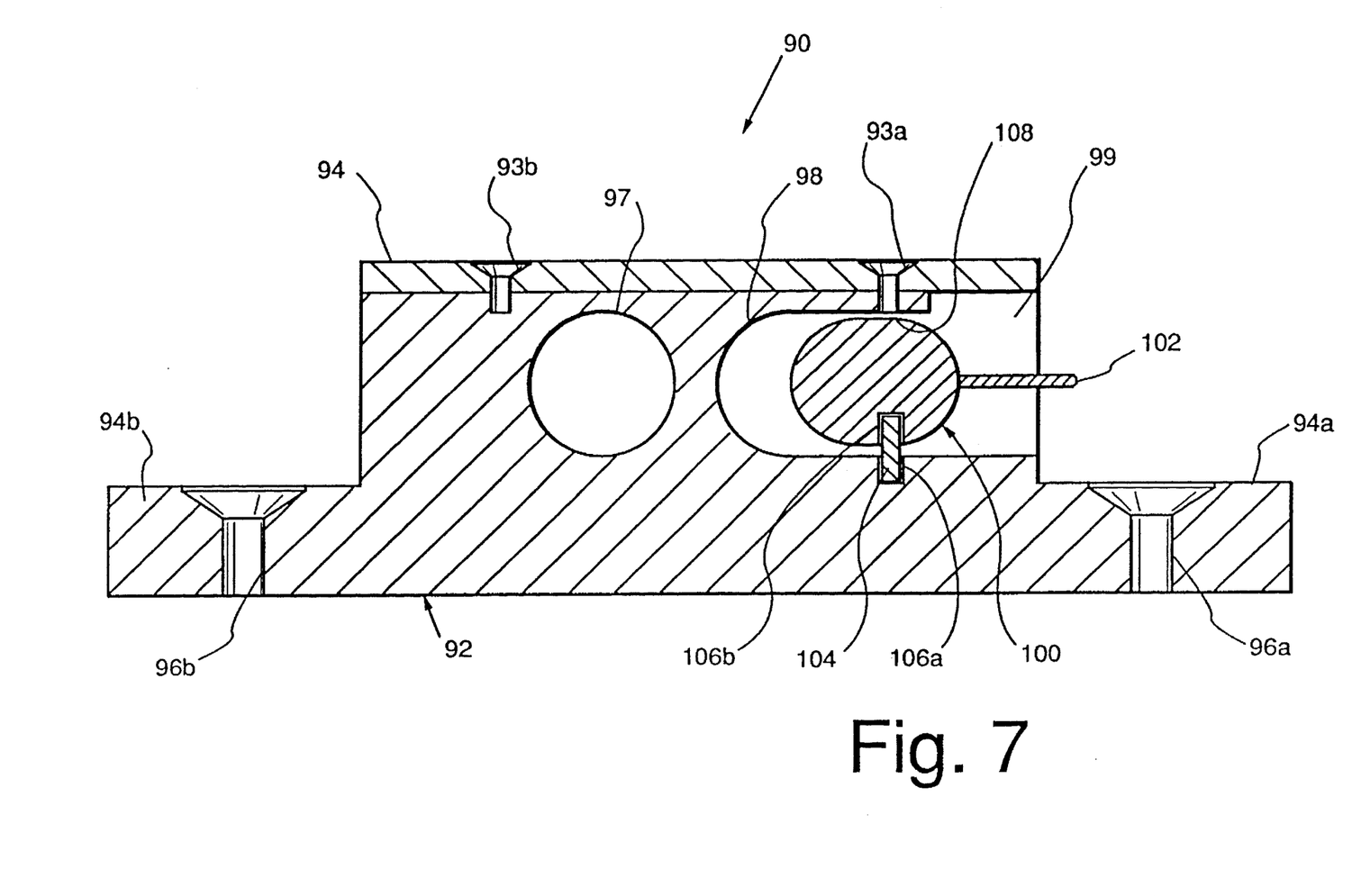
FIG. 7 is a sectional view of yet another embodiment of an improved rope cleat.

FIG. 7 is a cross-sectional view showing yet another alternate embodiment of a rope cleat device 90 which operates in the same manner as the cleats 2 and 50 illustrated in FIGS. 1–6.

In this embodiment, the device 90 includes an elongated base or body 92 having a pair of generally circular (in cross-section) passageways 97 and 98 formed therethrough and extending transverse to the length of the base 92. The base 92 also has a cavity or chamber 99 formed therein adjacent one side of the passageway 98. The base 92 can be mounted to any flat surface by means of a plurality of screws (not shown) extended through screw holes 96a and 96b formed through tabs 94a and 94b disposed at either end of the base 92.

A lid plate 94 is disposed above the base 92 and is attached to the top portion thereof by means of a plurality of screws (not shown) extended through screw holes 93b and 93a formed through the lid 94 and extending into a portion of the body 92.

An eccentrically rotatable cam or engaging member 100 is pivotally disposed in the base 92 such that it normally extends into passageway 98. The cam 100 is pivotally mounted within the cavity 99 by means of a dowel 104 that is partially inserted into a dowel hole 106b formed in a bottom portion of the cam 100. The other end of the dowel 104 is disposed in a dowel hole 106a formed in the body 92. In an alternate embodiment, the dowel 104 could be an integral part of the member 100 and extend therefrom into the dowel hole 106a. A cam positioning lever 102 extends from the cam 100, out through a slot (not shown) cut in one side of the base 92.

The operation of the cam 100 and its interaction with a rope drawn through the passageway 98 is nearly identical to that of cam 12 and passageway 18 (FIGS. 4–5), and cam 64 and passageway 84 (FIG. 6).

In this embodiment, a screw (not shown) is extended through the hole 93a and is engaged with a flat surface 108 formed at the top portion of the member 100. It will be appreciated from the figure that the longitudinal axes of the screw hole 93a and the dowel 104 are substantially aligned. The cam 100 rotationally pivots about the dowel 104 and the contact point between the flat surface 108 and the screw extended through the hole 93a.

Although the present invention has been described in terms of a specific embodiment and two alternate embodiments, it is anticipated that alterations and modifications thereof will no doubt become apparent to those skilled in the art. It is therefor intended that the following claims be interpreted as covering all such alterations and modifications as filed in the true spirit and scope of the invention.

What is claimed is:

1. An improved rope cleat device comprising:
 a) a housing including a first passageway extending therethrough and a chamber formed adjacent to and connected with said first passageway, said first passageway for receiving therethrough a length of rope drawn through said passageway in either a first direction or an oppositely directed second direction, and a second passageway formed generally parallel to said first passageway and not connected with either of said chamber or said first passageway, said second passageway providing a guideway or tie down for the rope;
 b) an engaging member pivotally mounted within said chamber and eccentrically rotatable between either a first position or a second position, such that in said first position said member partially blocks said passageway and engagingly contacts said rope and prevents it from being drawn in said second direction, and in said second position said member does not block said passageway and does not engagingly contact said rope, said member including a first surface having a plurality of gripping teeth or lugs formed thereon for embedding into said rope, and a second generally flat surface, whereby when said member is in said first position said first surface is disposed within said first passageway engagingly contacting said rope such that when an attempt is made to draw said rope through said first passageway in said second direction said teeth or lugs are embedded into said rope so as to prevent movement thereof, and when said rope is drawn in said first direction said teeth or lugs are disembedded from said rope so as to allow movement of said rope in said first direction, and when said member is in said second position said second flat surface is disposed within said first passageway, said rope is free to move through said first passageway in either of said first or said second directions;

c) means including a coil spring for resiliently biasing said member into said first position, said spring extending between a portion of said housing and a portion of said cam;

d) lever means extending from said cam and through a first slotted opening formed in a wall of said chamber for rotating said member toward said second position in opposition to said biasing means to release engagement with said rope; and (e) a lid for covering said chamber, said lid having a second slotted opening formed therethrough and aligned with said first slotted opening such that said lever means can freely move from said first slotted opening to said second slotted opening, whereby when said member is in said first position said rope may be freely pulled through said passageway in said first direction but not said second direction, and when said member is in said second position said rope may be freely pulled through said passageway in either of said first or said second directions.

2. An improved rope cleat device comprising:

a) a housing including a first passageway that is generally U-shaped in cross-sections formed in the top of said housing and extending therethrough, and a chamber formed adjacent to and connected with said first passageway, said first passageway being open at the top for receiving therethrough a length of rope drawn through said passageway in either a first direction or an oppositely directed second direction;

b) a cleat device including a lid plate disposed above the housing and hingedly attached thereto, and having a downwardly extending rib formed in the lower surface of said lid plate that is aligned with the open top of said U-shaped passageway pivotally mounted within said chamber and eccentrically rotatable between either a first position or a second position, such that in said first position said cleat device partially blocks said passageway and engagingly contacts said rope and prevents it from being drawn in said second direction, and in said second position said cleat device does not block said passageway and does not engagingly contact said rope;

c) means for resiliently biasing said cleat device into said first position;

d) means for rotating said cleat device toward said second position in opposition to said biasing means to release engagement of said rope;

e) latching means for selectably latching said lid plate to said housing, whereby when said cleat device is in said first position, said rope may be freely pulled through said passageway in said first direction but not said second direction, and when said cleat device is in said second position said rope may be freely pulled through said passageway in either of said first or said second directions.

3. An improved rope cleat device as recited in claim 2, further including:

a lid plate disposed above the housing and attached thereto;

means for attaching said lid plate to said housing, said attaching means contacting a flat top surface of said engaging member; and lower pivot means, said engaging member being held in position by said attaching means and rotatable about said said lower pivot means.

4. An improved rope cleat device as recited in claim 3, wherein said attaching means includes a screw extended through a first hole being formed in said lid plate, said first hole disposed in registration with a second hole formed in said housing, the end of said screw being in contact with said flat top surface of said engaging member.

* * * * *